March 20, 1945.  B. NORDFELDT  2,372,112
POLYPHASE DIRECT CURRENT SATURATED INDUCTANCE
Filed July 31, 1940   2 Sheets-Sheet 1

Inventor
BIRGER NORDFELDT,
By William Wallace White & Scott
Attorney

March 20, 1945.  B. NORDFELDT  2,372,112
POLYPHASE DIRECT CURRENT SATURATED INDUCTANCE
Filed July 31, 1940  2 Sheets-Sheet 2
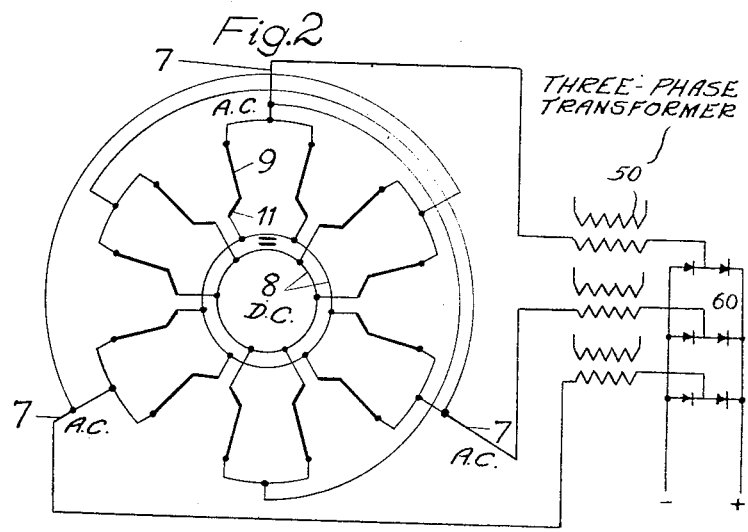
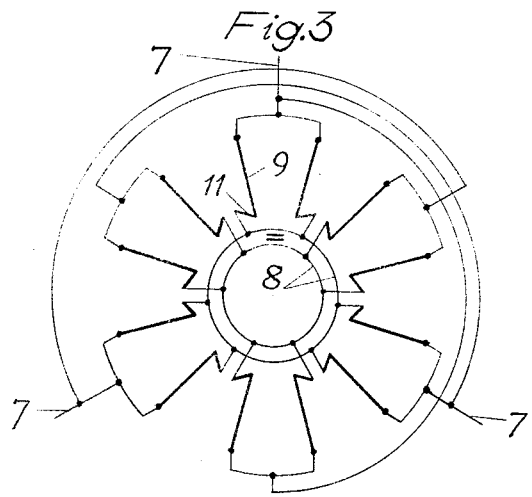
INVENTOR
Birger Nordfeldt
BY
Wm. Wallace White
ATTORNEY Patented Mar. 20, 1945

2,372,112

UNITED STATES PATENT OFFICE 2,372,112

POLYPHASE DIRECT CURRENT SATURATED INDUCTANCE

Birger Nordfeldt, Vasteras, Sweden, assignor to Allmänna Svenska Elektriska Aktiebolaget, Vasteras, Sweden, a corporation of Sweden Application July 31, 1940, Serial No. 348,916
In Sweden August 1, 1939

11 Claims. (Cl. 175—363)

In direct current saturated inductances, it is known to cause the direct current and the alternating current influenced thereby to traverse the same winding. Hereby conductor material and winding space is economized, and at the same time the leakage between the direct current and alternating current ampere turns is reduced to the smallest possible value, which is important for the operation of the inductance. The present invention provides a solution of the problem of applying the aforesaid principle to polyphase inductances. According to the invention, the inductance is in such case composed of two polyphase windings having neutral points, thus connected for instance in star or zig-zag, said windings having common outer terminals but separate neutral points which form the two direct current terminals. The inductance is adapted for use wherever it is desired to regulate the voltage or the current of a polyphase system, for example for keeping constant voltage on a section of such a system when the feeder voltage varies. The inductance has, however, been found particularly useful in cooperation with rectifying equipment, for example, for charging batteries, in which case it may be important to control the voltage or the current or both according to a certain program.

Figure 1:
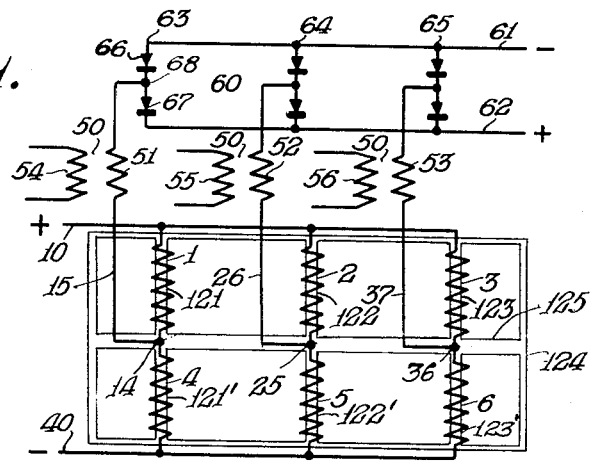

Some forms of the invention are diagrammatically illustrated in Figs. 1-3 of the accompanying drawings.

Fig. 1 shows the invention applied to a three-phase inductance. The two star-connected three-phase windings are designated by 1, 2, 3 and 4, 5, 6, their common outer terminals by 14, 25, 36, and their two neutral points, at which the direct current enters and leaves the apparatus, by 10 and 40. The direct current divides itself into three parallel branches, one of which passes through the windings 1 and 4, one through 2 and 5 and one through 3 and 6. Each phase current of the alternating current divides in two parallel branches through the two three-phase star windings. The direct current terminals are thus equipotential for the fundamental frequency of the alternating current, and the alternating current terminals are in their turn equipotential for the direct current, whence none of the currents influences the other conductively as regards the fundamental wave. All the six phase windings are preferably wound on different iron cores 121a, 121b, 122a, 122b, 123a and 123b as in Fig. 1a, or on different legs 121, 121¹, 122, 122¹, 123 and 123¹, as in Fig. 1 which, together with the intermediate yoke 125 of one iron core 124 offers a return path to the flux which thus can flow independently of the flux of other phases. In this manner, the alternating current is also prevented from inducing any voltage of the fundamental frequency in the direct current circuit. The higher harmonics induced in this circuit may be treated in the manner usual in direct current saturated inductances.

Circuits 15, 26, and 37 are connected to outer terminals 14, 25, and 36, respectively, these circuits including the secondary windings 51, 52, and 53 of a polyphase transformer 50, the primary windings 54, 55, and 56 being connected to a source of alternating current. Finally, a load may be connected to circuits 15, 26, and 37 through a rectifier 60 in Graetz connection, which includes two parallel branches 61 and 62 having three cross lines 63, 64, and 65 therebetween, each cross line including a pair of rectifiers 66 and 67 connected in series, with each circuit connected between a pair of rectifiers, as shown at 68.

Fig. 2 shows an inductance which also may be connected to a three-phase alternating current supply, but which has a twelve-phase character. This diagram shows the saturable reactor connected in series with a current source 50 which may be the secondary of a transformer, and to a rectifier 60 in the so-called Graetz connection. The different winding parts are here for the sake of simplicity represented by straight heavy lines, drawn in angular positions corresponding to the phase of their voltage. Each winding part connected between an alternating current terminal 7 and a direct current terminal 8 consists of two portions 9, 11 lying in different phase. The phase difference between these two portions is 60°, and the mutual proportion between the winding turn numbers is so chosen that the phase difference between the resultant voltage and the voltage of the longer winding component will be 15°.

The windings occupying equal angular position are of course supposed to be wound on the same core. As twelve different angular positions are shown, the number of the cores is also twelve.

While the resultant voltages between the alternating current terminals thus only represent three different phases symmetrically arranged, the partial voltages of the windings on the different cores represent twelve symmetrically distributed phases. The consequence of this is that various higher harmonics occurring in the alternating current and in the direct current in three-phase connection are suppressed, in analogy with what occurs in the alternating current of a twelve-phase rectifier as compared with a three-phase rectifier.

In Fig. 2, the two voltages of different phase 9 and 11 are anywhere combined under the comparatively favorable phase angle of 60°. On the other hand, the direct current ampere turns from the two windings on the same core will counteract each other, as is found in following the path of the direct current through two lines occupying the same angular position, one representing a long and the other a short phase winding. In Fig. 3, where the same reference numbers have been employed, the connection is such as to produce the opposite result, that is, the alternating current voltages combine under the unfavorable phase angle of 120°, but the direct current ampere turns from the two windings on the same core act in the same sense. The available supply of direct current and alternating current power in each particular case may decide which one of these two connections is to be preferred.

On the direct current side, voltages are induced, the fundamental frequency of which is six times that of the alternating current in a connection according to Fig. 1 and twelve times that of the alternating current in a connection according to Fig. 2 or 3. In this respect the device has the same character as a direct current saturated inductance in which the two alternating current windings are series connected as well as the two direct current windings. If there is no internal or external impedance of any importance in the direct current source, no appreciable voltage occurs between the direct current terminals, but a superposed alternating current of the aforesaid frequency in the direct current circuit. If, on the other hand, the direct current source is strongly inductive, the current is suppressed and the voltage obtains instead its full value. In the former case, the curve shape of the alternating current will be pointed, in the latter case, its curve shape will approach the rectangular one in Fig. 1 or a stepped one in Fig. 2 or 3.

If the inductance is intended to control the current through a certain load, the latter is preferably connected in series with the alternating current terminals, possibly with an intermediary transformer. If the load consists of a rectifier, it may be connected in the usual manner to the secondary of such a transformer, the primary of which is in series with the alternating current terminals of the inductance. The curve shape on the direct current side of such a rectifier is then substantially determined by the effective phase number of the inductance, whence the rectifier itself may be provided for a lower phase number and may still have the favorable character of the higher phase number.

Since the direct current and the alternating current sides are conductively connected, it is often suitable to employ a rectifier fed through an insulating transformer as a direct current source. If the inductance is to be magnetized also by a direct current proportional to the alternating current traversing it (self-magnetized), this current is preferably caused to traverse the alternating current winding, being taken through a series transformer and a rectifier, while other magnetizing components may be supplied through separate windings on the inductance or through the same winding, if their circuits contain so large resistances as to become comparatively independent of the current conditions in the inductance.

Figure 1A:
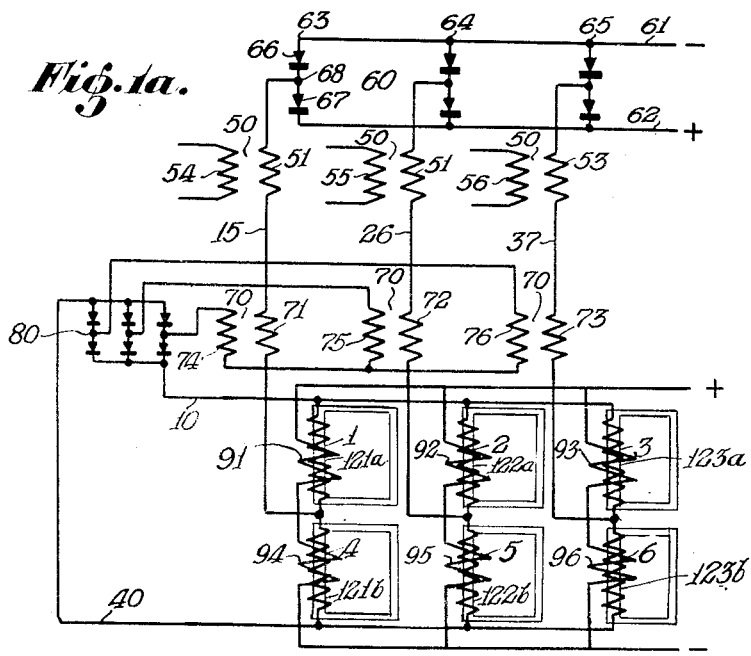

Fig. 1a is generally similar to Fig. 1, but illustrates these latter features, which include the winding of series transformer 70, the primary windings 71, 72, and 73 of which are connected in circuits 15, 26, and 36, to which circuits a load may be connected as described in Fig. 1. The secondary windings 74, 75, and 76 are connected to a rectifier 80 in Graetz connection, the rectifier being connected at 10 and 40 between the neutral points of the polyphase windings. Fig. 1a differs further from Fig. 1 in that separate windings 91 to 96, inclusive, are provided in the inductances, these windings being connected to a source of direct current for supplying other magnetizing components.

I claim as my invention:

1. A direct current saturable inductance comprising two polyphase alternating current windings having neutral points, one core having a return path supporting each phase of said windings, a direct current source connected between the neutral points of said polyphase windings, a polyphase alternating current source connected to the outer terminals of said polyphase windings, and load means connected to said outer terminals.

2. A direct current saturable inductance comprising two polyphase zig-zag connected alternating current windings, each divided into two parallel groups zig-zagged in opposite directions, a direct current source connected between the neutral points of said polyphase zig-zag windings, a polyphase alternating current source connected to the outer terminals of said polyphase windings, and load means connected to said outer terminals.

3. A direct current saturable inductance comprising two polyphase zig-zag connected alternating current windings, each divided into two parallel groups zig-zagged in opposite directions, a direct current source connected between the neutral points of said polyphase zig-zag windings, a polyphase alternating current source and a rectifier connected in series to the outer terminals of said polyphase windings, and an independent direct current load connected to the direct current terminals of said rectifier.

4. A polyphase direct current saturable inductance comprising two polyphase alternating current windings having outer terminals and neutral points and traversed by both a saturating direct current and an alternating load current, a core having a return path supporting each phase of said windings, a direct current source connected between the said neutral points, and an alternating current source connected to said outer terminals.

5. A polyphase direct current saturable inductance comprising two polyphase zig-zag connected windings having outer terminals and neutral points, each winding being divided into two parallel groups zig-zagged in opposite directions, a direct current source connected between said neutral points, a polyphase alternating current source connected to said outer terminals whereby the same windings are traversed by both the saturating direct current and the alternating current, and load means connected to said outer terminals.

6. A polyphase direct current saturable inductance comprising two polyphase zig-zag connected alternating current windings having outer terminals and neutral points and traversed by both direct current and by alternating current, each winding being divided into two parallel groups zig-zagged in opposite directions, a direct current source connected between said neutral points, a polyphase alternating current source and a rectifier connected in series to the said outer terminals, and an independent direct current load connected to the terminals of said rectifier.

7. In combination, a direct current saturable inductance comprising two polyphase windings having neutral points, one core having a magnetic return path supporting each phase of said windings, a direct current source connected between the neutral points of said polyphase windings, a polyphase alternating current source and a polyphase rectifier connected in series to the outer terminals of said polyphase windings.

8. In combination, a direct current saturable inductance comprising two polyphase alternating current windings having neutral points, a polyphase rectifier, polyphase transformer means, a polyphase alternating current source connected to the primary windings of said transformer means, the secondary windings of said transformer means being connected in series between a rectifier means and said polyphase windings between the neutral points thereof, and means for saturating the saturable inductance, additional windings on said inductance separate from the first named windings, and means for supplying direct current to said additional windings.

9. A direct current saturable inductance comprising two polyphase alternating current windings having neutral points and outer terminals, a circuit for connecting the outer terminals to a source of polyphase alternating current, said circuit including the primary winding of a polyphase transformer means, a rectifier supplied by the secondary winding of said transformer means, means connecting said rectifier between said neutral points, and a load supplied through a rectifier by said circuit means.

10. A polyphase direct current saturable inductance comprising two polyphase alternating current windings having outer terminals and neutral points and traversed by both direct current and alternating current, polyphase transformer means, a rectifier, a load supplied by said rectifier, a polyphase current source connected to the primary winding of said transformer means, circuit means connecting the secondary winding of said transformer means between said outer terminals and said rectifier, further polyphase transformer means having the primary winding thereof connected in said circuit means, and a polyphase rectifier fed by the secondary winding of said further transformer means, the neutral points of said alternating current windings being fed by said polyphase rectifier.

11. A direct current saturable inductance comprising two polyphase alternating current windings having neutral points and outer terminals, circuits for connecting the outer terminals to a source of polyphase alternating current, said circuits including the primary winding of a polyphase transformer means, a rectifier supplied by the secondary winding of said transformer means, means connecting the output of said rectifier between said neutral points, and a load supplied by said circuit means.

BIRGER NORDFELDT.